Nov. 10, 1959   G. H. BINGHAM, JR   2,912,368
METHOD OF MAKING HOLLOW METAL LASTS
Filed March 4, 1958
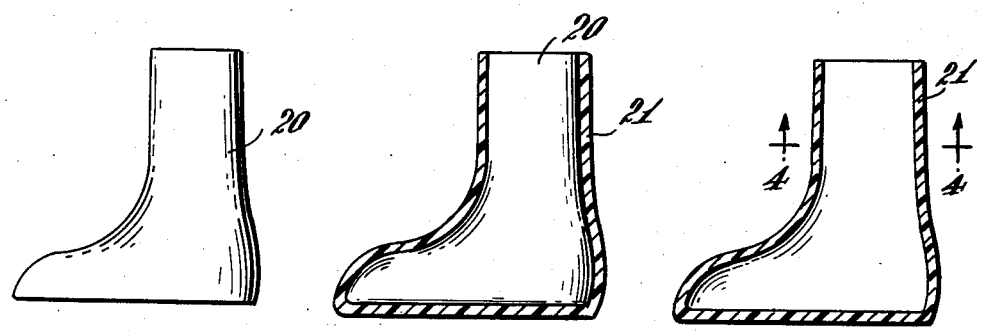
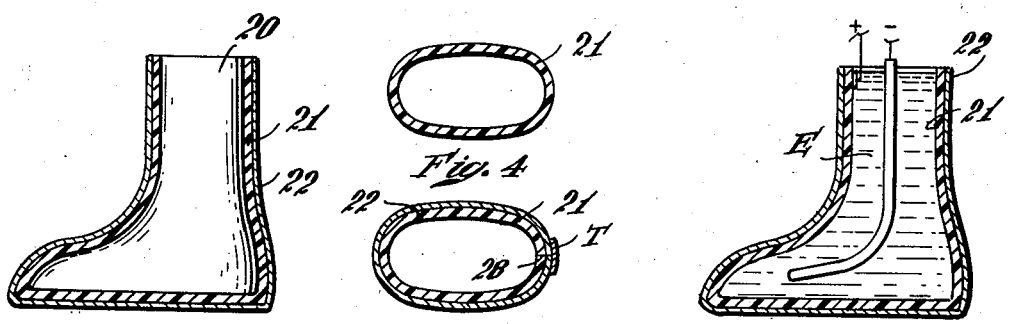
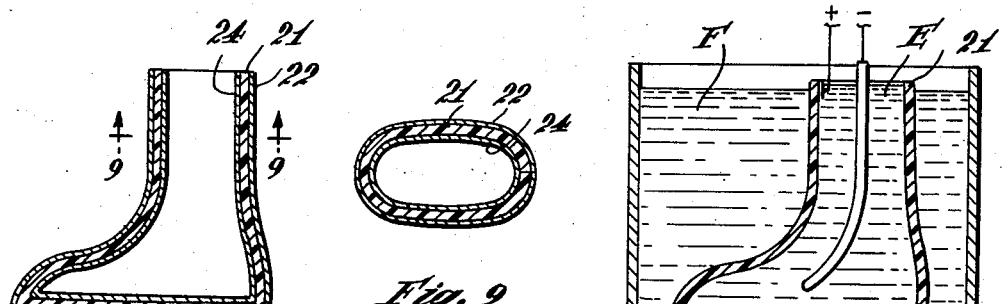
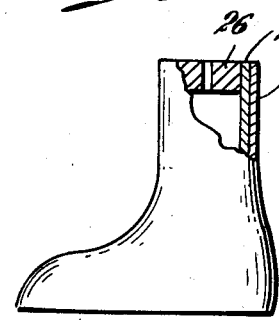
Inventor
George H. Bingham, Jr.
by Roberts Cushman & Grover
Att'ys

United States Patent Office 2,912,368
Patented Nov. 10, 1959

2,912,368

METHOD OF MAKING HOLLOW METAL LASTS

George H. Bingham, Jr., Westminster, Md., assignor to Cambridge Rubber Company, Taneytown, Md., a corporation of Maryland Application March 4, 1958, Serial No. 719,086

3 Claims. (Cl. 204—9)

This invention pertains to a novel method of making lasts for use in the manufacture of footwear, in particular to a method of making metal lasts, such as are employed in the manufacture of rubber footwear and more especially to a method of making hollow metal lasts.

In the manufacture of rubber footwear it is necessary to employ lasts which will withstand the high temperature and the chemicals employed in the vulcanizing process and for this reason metal lasts, rather than wooden lasts, are employed. These lasts must be accurate in shape and size and have a smooth surface finish and as made, according to customary prior procedures, are expensive and represent a large capital investment on the part of the boot manufacturer. Moreover, even though they be made of aluminum, as is common, the usual last is heavy and clumsy to handle. The present invention has for an object the provision of a novel method of making metal lasts, such that they may be produced more cheaply than by prior methods. A further object is to provide a method of making metal lasts which are accurately sized and shaped. A further object is to provide a method of making metal lasts such that the resultant last is light in weight and easier to handle than metal lasts as usually constructed. Other and further objects and advantages of the invention will be pointed out in the following more detailed description and by reference to the accompanying drawings, wherein:

Fig. 1 is a side elevation of a conventional metal last of the size and shape of the lasts which are to be made in accordance with the present invention;

Fig. 2 is a diagrammatic front-to-rear section through the last of Fig. 1, showing it as invested in a jacket which closely covers all of its exterior surface except its top;

Fig. 3 is a front-to-rear section similar to Fig. 2, but with the last removed, leaving the investment as a hollow boot-like article whose interior surface is an exact replica, but in reverse, of the exterior surface of the last of Fig. 1;

Fig. 4 is a section on the line 4—4 of Fig. 3;

Fig. 5 is a diagrammatic vertical, front-to-rear section showing an assembly comprising the article shown in Fig. 3 provided with shape-retaining supporting means in the form of an external coating of relatively stiff and hard material;

Fig. 6 is a diagrammatic horizontal section through an assembly like that of Fig. 5, which has been split downwardly from its top to permit removal of the last, and which has then been sealed along the split by an external tape;

Fig. 7 is a vertical, front-to-rear section showing the assembly of Fig. 5 arranged for the deposition of an electroplated metallic coating on its interior surface;

Fig. 8 is a view similar to Fig. 5, but showing the structure of Fig. 5 without the last and having a coating of electro-deposited metal on its inner surface;

Fig. 9 is a section substantially on the line 9—9 of Fig. 8;

Fig. 10 is a view, generally similar to Fig. 7, but illustrating alternative means for maintaining the shape of the article of Fig. 3 during the electroplating of its interior; and Fig. 11 is a vertical, front-to-rear view showing a completed hollow metal last made in accordance with the present method.

Referring to the drawings, the numeral 20 designates a last of conventional type such, for example, as a metal last of the kind employed in the manufacture of rubber footwear, and which, in the present instance, may be assumed to be of the exact size and style of the lasts which are to be made following the present method.

Having provided this last, it is next invested with a covering or casing 21 (Fig. 2) which, in accordance with a preferred procedure, is of elastically stretchable material, for example rubber, rubber latex or the like, which may be applied by a dipping or other customary method. However, this covering should be of sufficient thickness so that after curing, as by vulcanization, it may be stripped from off the last as a hollow unit without undergoing rupture or permanent distortion. If, in removing it from the last, it is turned inside out, it should next be turned rightside out, and its interior, assuming that it is not distorted, will be an exact replica but in reverse of the outer surface of the last. While it is contemplated that such a hollow unit of pure gum rubber or latex will be resiliently shape-retaining to a degree sufficient for the purpose, it is contemplated that it may receive an outer coating 22 (Fig. 5), preferably while still on the last, such as to stiffen it to some extent, although not sufficiently to prevent its removal as an unruptured hollow unit from the last. For example, after the first coating 21 has been formed and either before or after vulcanization another coating of the same material may be applied and cured before removing the unit from the last. As a further possible procedure the original coating 21, before removal from the last, may receive a coating of material which becomes hard and shape-retaining, for example a rubber compound containing a mineral filler, fibreglas or the like, and which, when cured, limits the stretchability of the first coating 21. If this latter procedure be followed, then the unit must be slit downwardly from its top sufficiently to permit it to be sprung away from the last and removed. An equivalent unit, necessitating slitting for removal, may be made by building up on the last a conventional rubber boot by usual rubber footwear methods, or by drawing a sock of stockinette material over the last and then coating this sock with latex and vulcanizing.

If the unit 21 be made of or encased in materal which inhibits its stretchability so that it, in effect, becomes a boot which cannot be removed otherwise from the last, it may be slit downwardly from its upper edge, for example at its rear, as shown at 28 (Fig. 6). After removal from the last the slit may be closed leak-tight, for instance by applying a waterproof adhesive tape T to close the slit and this tape remains in place during electroplating; it is then removed and the boot separated from the hollow metal last. Instead of keeping the slit closed by means of an adhesive tape, the edges of the slit may be kept in close contact by enveloping the boot in an elastically constrictive sock of a size and shape such that when pulled over the boot it applies constrictive pressure to all points of the latter and thus holds the slot closed and leak-tight while the electroplating operation is taking place. If the hollow unit must be split for removal from the last, the resultant hollow last may have a slight fin projecting at the location of the slit, but this fin can readily be removed by grinding or the like during the finishing of the last.

Regardless of the method of preparing the hollow unit, as above described (and whose interior surface is smooth and an exact replica but in reverse of the last) the hollow unit is now filled to the height of the boot which is to be made with a suitable electrolyte E, as shown in Fig. 7, the interior of the unit having first been coated with graphite or other customary conducting material employed in electroplating. Since the unit 21, prepared as above described, and which is quite flexible would be distorted by the weight of the electrolyte, it must be maintained in its initial shape by suitable supporting means. The outer coating 22, made as above suggested, and if of sufficient thickness, constitutes effective supporting means for the hollow unit 21. Having introduced a suitable electrode and connected the electrode and the coating of the interior on the unit to a source of current, the interior of the unit 21 receives a plating 24 (Figs. 8 and 9) of the selected metal, for example copper or brass. This plating may be built up to any desired thickness after which the electrolyte is poured out, the unit 21 with its coating 22 removed, and the metallic coating or shell 24 finished to form a last. If it be desired to make the metal shell more rigid, it may receive an internal coating 25 (Fig. 11), of any desired material, for instance a coating of soft solder, asbestos cement or the preparation known as "liquid metal." Its upper edge may be trimmed smoothly and a filler plug 26, having a spindle-receiving opening, is fixed in the upper end of the leg portion.

Instead of providing the unit 21 with a shape-maintaining outer coating such as the coating 22, its shape may be maintained, without sacrifice of its elasticity, by suspending it, during the electroplating operation, as illustrated in Fig. 10, in a receptacle containing a fluid F of approximately the same specific gravity as that of the electrolyte E, so that the fluid pressure is substantially the same at all points, internally and externally. Such a procedure reduces the number of operations in forming the last.

It will be observed, that by following the procedure herein above described, the exterior surface of the resultant last is an exact replica of that of the model last, and that having once prepared the hollow unit by the use of the model last, the hollow unit may be used to make as many lasts, all exactly like the model last, as may be desired.

Since the metal shell 24, produced by the electroplating operation, may, if desired, be quite thin, such a shell, without reinforcement, constitutes a very desirable display form, being very light in weight, but stiff and having a smooth outer surface.

While certain desirable steps have been suggested for the preparation of a hollow last, as above described, it is to be understood that the method as described is merely by way of example and that equivalent steps and/or a different order of steps may be employed if desired within the scope of the invention as defined in the appended claims.

I claim:

1. The method of making metal lasts which comprises as steps providing a last of the size and contour of the metal last to be made, building up upon the last a covering, in accordance with usual rubber footwear procedure, to form, in effect, a boot, coating the exterior of said boot while still on the last with a rubber compound containing fibreglass thereby to limit the stretchability of the boot, slitting the boot downwardly from its top a distance sufficient to permit the boot to be sprung away from the last and removed from the latter, enveloping the boot in an elastically constrictive sock of a size and shape such that when pulled over the boot it applies constrictive pressure to all points of the latter and thus holds the slit closed, introducing an electrolyte into the interior of the boot and applying a layer of metal to the inner surface of the boot by electroplating, removing the electrolyte from the interior of the boot, removing the sock from the exterior of the boot, and then spreading the boot at the slit and removing it from the metal layer.

2. The method according to claim 1, further characterized in applying to the inner surface of the hollow layer of metal a coating of a reinforcing medium.

3. The method according to claim 1, further characterized in fixing a plug within the upper end of the hollow metallic layer, said plug having a bore for the reception of a last-supporting spindle.

References Cited in the file of this patent

UNITED STATES PATENTS

| 2,217,164 | Gongonsky | Oct. 8, 1940 |
| 2,327,762 | Bull | Aug. 24, 1943 |

FOREIGN PATENTS

| 8,108 | Great Britain | Mar. 11, 1893 |